US008601002B1

(12) United States Patent
Ali et al.

(10) Patent No.: US 8,601,002 B1
(45) Date of Patent: Dec. 3, 2013

(54) METHOD AND SYSTEM FOR IDENTIFYING JOB CANDIDATES

(75) Inventors: Syed Mohammed Ali, Sunnyvale, CA (US); Adam Hyder, Los Altos, CA (US); Changsheng Chen, Castro Valley, CA (US); Kam Wing Chu, Burlingame, CA (US)

(73) Assignee: Jobvite, Inc., Burlingame, CA (US)

( * ) Notice: Subject to any disclaimer, the term of this patent is extended or adjusted under 35 U.S.C. 154(b) by 91 days.

(21) Appl. No.: 13/284,260

(22) Filed: Oct. 28, 2011

Related U.S. Application Data (60) Provisional application No. 61/408,571, filed on Oct. 30, 2010.

(51) Int. Cl.
*G06F 17/30* (2006.01)

(52) U.S. Cl.
USPC .......................................... 707/748

(58) Field of Classification Search
USPC .................................. 707/733, 748
See application file for complete search history.

(56) References Cited

U.S. PATENT DOCUMENTS

| | | | |
|---|---|---|---|
| 5,826,022 A | 10/1998 | Nielsen | |
| 5,937,162 A | 8/1999 | Funk et al. | |
| 6,141,666 A | 10/2000 | Tobin | |
| 6,163,802 A | 12/2000 | Lin et al. | |
| 6,192,396 B1 | 2/2001 | Kohler | |
| 6,381,592 B1 | 4/2002 | Reuning | |
| 6,385,620 B1 | 5/2002 | Kurzius et al. | |
| 6,449,765 B1 | 9/2002 | Ballard | |
| 6,618,747 B1 | 9/2003 | Flynn et al. | |
| 6,662,194 B1 | 12/2003 | Joao | |
| 6,721,784 B1 | 4/2004 | Leonard et al. | |
| 6,968,313 B1 | 11/2005 | Oran | |
| 6,976,056 B1 | 12/2005 | Kumar | |
| 7,158,986 B1 | 1/2007 | Oliver et al. | |
| 7,310,626 B2 | 12/2007 | Scarborough et al. | |
| 7,558,795 B2 | 7/2009 | Malik et al. | |
| 7,617,176 B2 | 11/2009 | Zeng et al. | |
| 7,774,229 B1 | 8/2010 | Dernehl et al. | |
| 8,001,057 B1 | 8/2011 | Hill | |

(Continued)

FOREIGN PATENT DOCUMENTS

CA    1318036 C    5/1993

OTHER PUBLICATIONS

C.E McCollister, Ensuring electronic mail system delivery capability, IEEE Military Communications, vol. 1, 1999 (5 pages).
Web Archive, "Recommend.it.com" Jun. 10, 1988 (4 pages).
Dialog file 636 #03631982 entitled "Argos Business Solutions: customer referral scheme encourages sale of mobile phones" M1 press wire, PNA, Jul. 8, 1997 (2 pages).

(Continued)

*Primary Examiner* — Ajay Bhatia
*Assistant Examiner* — Grace Park
(74) *Attorney, Agent, or Firm* — Osha Liang LLP (57) ABSTRACT

A method for ranking profile records. The method includes receiving a search request from a user, obtaining a user profile associated with the user, generating a query based on the search request, issuing the query to a profile database, receiving search results in response to the query, wherein the search results comprise a plurality of profile records, and wherein each of the plurality of profile records comprises a plurality of action records and is associated with a potential job candidate, ranking the plurality of profile records using the user profile and a plurality of network scores to obtain ranked profile records, and transmitting the ranked profile records to the user.

18 Claims, 8 Drawing Sheets

(56) References Cited

U.S. PATENT DOCUMENTS

| | | | |
|---|---|---|---|
| 2005/0216295 A1 | 9/2005 | Abrahamsohn | |
| 2005/0261965 A1 | 11/2005 | Eisen et al. | |
| 2006/0042483 A1* | 3/2006 | Work et al. | 101/91 |
| 2006/0224721 A1 | 10/2006 | Rowe et al. | |
| 2006/0224729 A1 | 10/2006 | Rowe et al. | |
| 2006/0242014 A1 | 10/2006 | Marshall et al. | |
| 2006/0253315 A1 | 11/2006 | Ramsey et al. | |
| 2006/0265267 A1* | 11/2006 | Chen et al. | 705/9 |
| 2007/0043603 A1* | 2/2007 | Andersen et al. | 705/9 |
| 2008/0172415 A1* | 7/2008 | Fakhari et al. | 707/104.1 |
| 2009/0299993 A1* | 12/2009 | Novack | 707/5 |
| 2010/0036712 A1 | 2/2010 | Abrahamsohn | |
| 2010/0131418 A1* | 5/2010 | McCagg et al. | 705/321 |
| 2010/0191589 A1 | 7/2010 | Matte | |
| 2011/0022528 A1 | 1/2011 | Hennessy | |
| 2011/0112976 A1 | 5/2011 | Ryan et al. | |
| 2011/0196802 A1 | 8/2011 | Ellis et al. | |
| 2011/0276376 A1 | 11/2011 | Schmitt | |
| 2012/0095931 A1 | 4/2012 | Gurion et al. | |

OTHER PUBLICATIONS

Tutton, Nikole; "Social Media and Recruiting a Diverse Workforce—Can you have both???," http://www.recruitingblogs.com/profiles/blogs/social-media-and-recruiting-a?xg_source=activity; Jun. 16, 2010; pp. 1-4.

Vicknair, J., Elkersh, D., Yancey, K, and Budden, N.C; "The Use of Social Networking Websites as a Recruiting Tool for Employers," American Journal of Business Education; Nov. 2010; cluteonline.com; pp. 7-12.

http://web.jobvite.com/rs/jobvite/images/Jobvite%202010%20Social%20Recruiting%20Report_2.pdf; 2010; pp. 1-15.

Bartlett, B., Gui, L., Gulland, S., Grehan, J., Kuncik, a., Medoff, S., Profto, C., Schiff, S Silva Cano, G.; "Revitalizing Military Recruitment Without Restoring the Draft;" May 12, 2009, 265 pages.

Fernandez, R.M., and Sosa, M.L; "Gendering the Job: Networks and Recruitment at a Call Center," American Journal of Sociology, 2005; 49 pages.

* cited by examiner

METHOD AND SYSTEM FOR IDENTIFYING JOB CANDIDATES

CROSS-REFERENCE TO RELATED APPLICATIONS

This application claims priority under 35 U.S.C. §119(e) to U.S. Provisional Application Ser. No. 61/408,571 filed on Oct. 30, 2011. U.S. Provisional Application Ser. No. 61/408, 571 is hereby incorporated by reference into this application.

BACKGROUND

When companies are looking to hire a new employee for a job, they need to advertise the new job so that job candidates become aware of the new job opportunity and apply for the job. Companies typically advertise the new job by encouraging their employees and third parties (e.g., recruiters) to tell people they know to apply for the job. However, this ad hoc approach is traditionally inefficient in terms of identifying good job candidates.

SUMMARY

In general, in one aspect, the invention relates to a method for ranking profile records comprising receiving a search request from a user, obtaining a user profile associated with the user, generating a query based on the search request, issuing the query to a profile database, receiving search results in response to the query, wherein the search results comprise a plurality of profile records, and wherein each of the plurality of profile records comprises a plurality of action records and is associated with a potential job candidate, ranking the plurality of profile records using the user profile and a plurality of network scores to obtain ranked profile records, and transmitting the ranked profile records to the user.

In general, in one aspect, the invention a computer readable storage medium comprising instructions for ranking profile records, the instructions comprising functionality to receive a search request from a user, obtain a user profile associated with the user, generate a query based on the search request, issue the query to a profile database, receive search results in response to the query, wherein the search results comprise a plurality of profile records, and wherein each of the plurality of profile records comprises a plurality of action records, rank the plurality of profile records using the user profile and a plurality of network scores to obtain ranked profile records, and transmit the ranked profile records to the user.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to identifying potential job candidates. More specifically, embodiments of the invention relate to issuing queries to locate potential job candidates and then performing various actions to limit the result set to improve the quality of results for the user. In another embodiment of the invention, information about potential job candidates and users may be tracked, resulting in the improvement of the quality of the search results.

Figure 1:
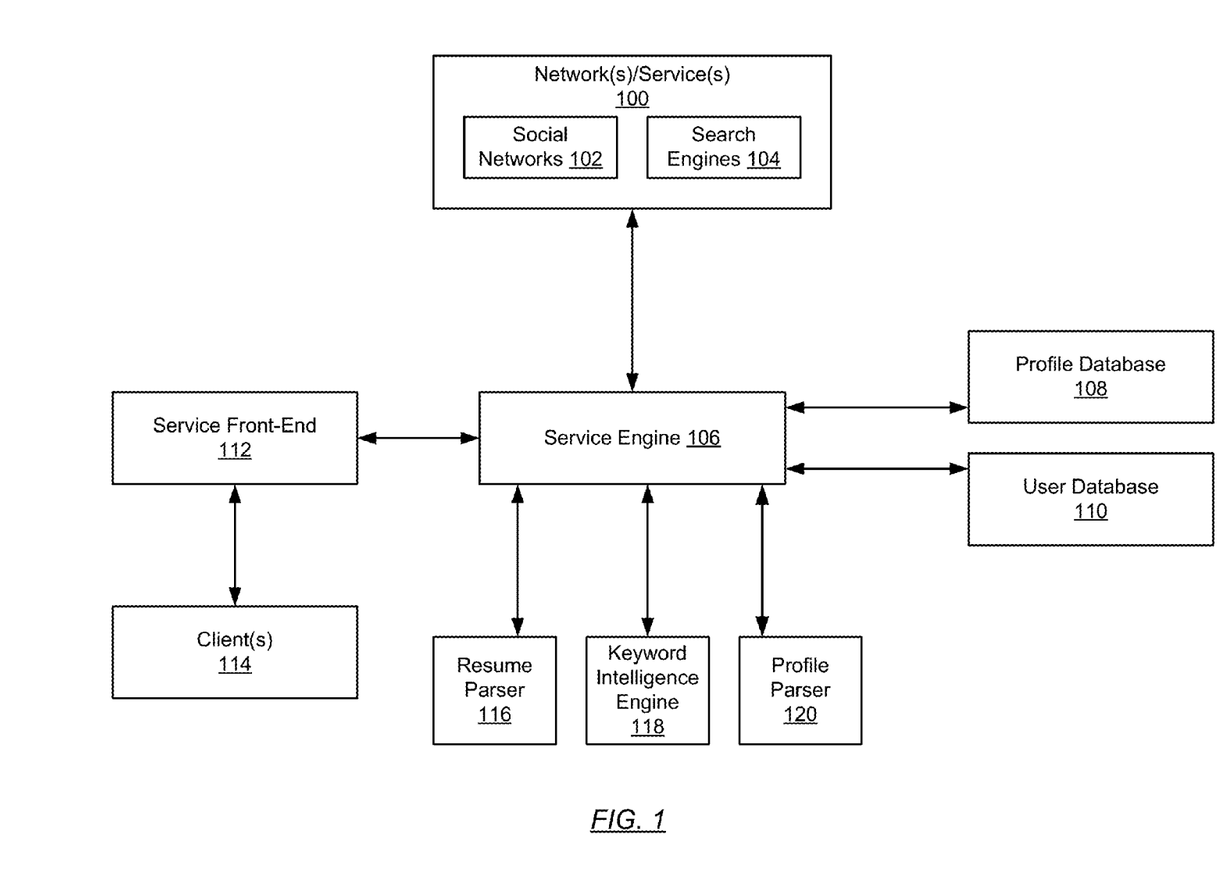
FIG. 1 shows a system in accordance with one or more embodiments of the invention.

FIG. 1 shows a system in accordance with one or more embodiments of the invention. The system includes one or more clients (114), a service front-end (112), a service engine (106), a profile database (108), a user database (110), a resume parser (116), a profile parser (120), and a keyword intelligence engine (118). Each of these components is described below.

In one embodiment of the invention, each client (114) corresponds to a remote system configured to interface with the service front-end (112). The client may be a mobile device (e.g., smart phone, iPad, tablet computer, laptop, etc.) or any other non-mobile computer device (e.g., desktop, etc.) with functionality to interface with the service front-end (112). Such functionality may include, but is not limited to, a web browser or standalone application and a network connection.

In one embodiment of the invention, the service front-end (112) includes functionality to interface with the clients and the service engine (described below). In one embodiment of the invention, the service front-end (112) is implemented as a web-server configured to serve web-pages to the client and to receive input from the client via the client's web browser and/or a standalone application on the client. In one embodiment of the invention, if the client is executing a web browser to interface with the service front-end (112), then the service front-end (112) includes the web pages to send to the clients. Upon receipt of input from the client, the service front-end (112) is configured to extract and, if necessary, modify the input, prior to sending the input to the service engine. Similarly, upon receipt of the search results (described below) from the service engine, the service front-end (112) is configured to perform the required formatting of such search results or other information received from the service engine, prior to sending the formatted search results (or other information) to the client(s). In one embodiment of the invention, the service front-end (112) may interact with multiple clients simultaneously.

In one embodiment of the invention, the service engine (106) is configured to interface with the service front-end (112) (as described above), the resume parser (116), the keyword intelligence engine (118), the user database (110), the profile database (108), and the network(s)/services (100). In one embodiment of the invention, the service engine (106) interacts with the user database (110) and keyword intelligence engine (118) to generate queries for issuing to the network(s)/service(s) and/or the profile database (108). In one embodiment of the invention, the service engine (106) is configured to interact with the resume parser (116) to obtain parsed resumes, which are used to populate and/or update profile records in the profile database (108). In one embodiment of the invention, the service engine (106) is configured to interact with the profile database (108) and the user database (110) to score profiles in the search results.

In one embodiment of the invention, the service engine (106) is configured to track a user's interaction with the profile records (described below). This information may be used to determine user preferences (see FIG. 2B) as well as to score profile records (described below).

In one embodiment of the invention, the resume parser (116) is configured to obtain electronic resumes and to apply known parsing techniques to extract the information from the obtained resumes such that the information may be used by other components in the system.

In one embodiment of the invention, the profile parser (120) is configured to receive profile records and user records from the service engine (106) and to apply known parsing techniques to extract the information from the profile records and the user records such that the information may be used by other components in the system.

In one embodiment of the invention, the keyword intelligence engine (118) is configured to determine associated keywords when presented with a particular keyword or set of keywords. The keyword intelligence engine (118) may propose associated keywords to broaden the search as well as narrow the search to obtain the most appropriate job candidates. For example, if the keyword intelligence engine (118) is presented with the word "linux," the keyword intelligence engine (118) may return the work "unix." In one embodiment of the invention, the keyword intelligence engine (118) includes functionality to parse electronic documents to determine which particular words are associated with other particular words. The associated keywords generated by the keyword intelligence engine (118) may be used to provide additional keywords to include in queries generated by the service engine (106). In one embodiment of the invention, the service engine (106), the keyword intelligence engine (118), or another process determined associated keywords based on the "context of the job." For example, if the search request specifies "architect," the keyword intelligence system may use the user preferences to suggest "software programmer" as an additional keyword.

Further, in one embodiment of the invention, the user is presented with the associated keywords and given the opportunity to accept, modify, or reject the associated keywords. By tracking this information, the service engine (106), the keyword intelligence engine (118), or another process is able to (i) present the user with a better selection of associated keywords in the future and (ii) present other users with better keywords in the future.

Figure 2A:
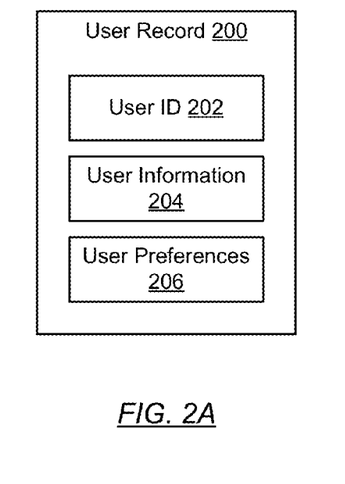
FIGS. 2A, 2B, 3A, and 3B show data structures in accordance with one or more embodiments of the invention.
Figure 2B:
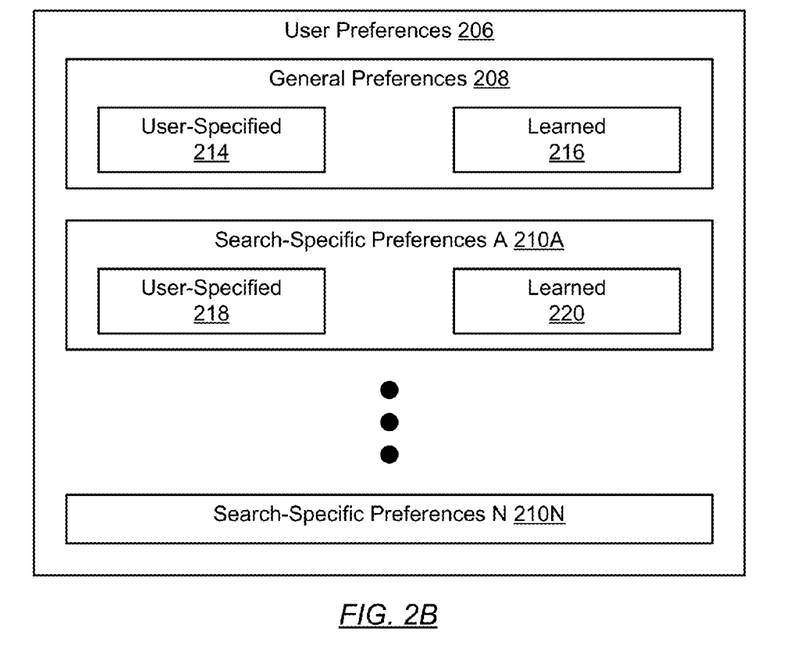
Figure 3A:
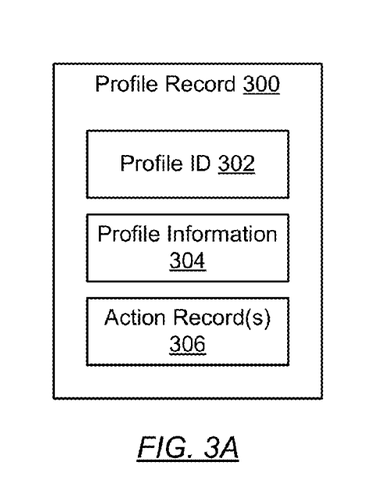
Figure 3B:
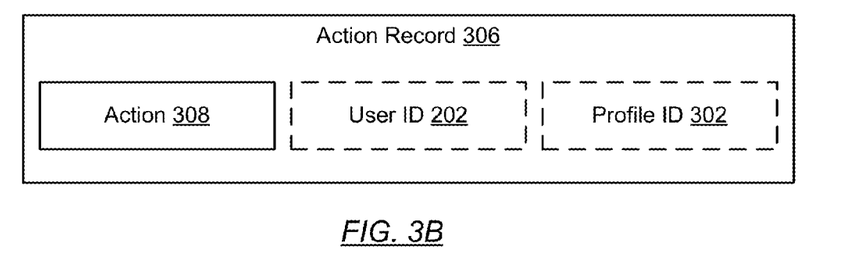

In one embodiment of the invention, the profile database (108) includes one or more profile records as described in FIGS. 3A and 3B. In one embodiment of the invention, the user database (110) includes one or more user records as described in FIGS. 2A and 2B. In one embodiment of the invention, the aforementioned databases may be implemented using any persistent data storage device and/or technology including, but not limited to, magnetic storage, and solid state storage.

In one embodiment of the invention, the network(s)/service(s) includes one or more social networks (102) and one or more search engines (104). In one embodiment of the invention, the network may be any type of network (e.g., WAN, LAN, Internet, etc.) and the service may be any service executing on a network. Examples of services include, but are not limited to, social networks (102), search engines (104), data aggregation services, data repositories, etc. Examples of social networks (102) include, but are not limited to, Facebook, Twitter, Linkedin, Plaxo, MySpace. Examples of search engines (104) include, but are not limited to, Google, Yahoo, and Bing.

Those skilled in the art will appreciate that the invention is not limited to the configuration shown in FIG. 1. Further, one or more of the aforementioned components may be combined without departing from the invention.

FIGS. 2A, 2B, 3A, and 3B show data structures in accordance with one or more embodiments of the invention.

FIG. 2A shows a user record in accordance with one or more embodiments of the invention. In one embodiment of the invention, the user records (200) are associated with users of the service engine (106). The users include, but are not limited to, recruiters, hiring managers, headhunters, or any other individual or entity that is looking for potential job candidates. In one embodiment of the invention, the user record (200) may include, but is not limited to, (i) a user identifier (ID) (202) used to uniquely identify the user; (ii) user information (204) which may include, but is not limited to, full name, company name, email, mailing address, phone number, job title, and number of years at the company; and (iii) user preferences (206) (see FIG. 2B).

FIG. 2B shows user preferences (206) in accordance with one or more embodiment of the invention. The user preferences may include, but are not limited to: (i) general preferences (208), which apply to all search results (discussed below); and (ii) one or more search-specific preferences (210A, 210N), which apply to particular searches the user has performed in the past. Further, each of the aforementioned preferences may be further sub-divided as: (i) user-specified (214, 218), which are preferences explicitly specified by the user; and (ii) learned (216, 220), which are user-preferences that the service engine (106) "learns" using machine learning techniques about the user as the user uses the system (e.g., performs various actions (described below)).

Examples of general preferences include, but are not limited to: (i) user only wants profile records that include information about the potential job candidate from LinkedIn; (ii) user only wants profile records in which the data in the profile record has been verified by at least two independent sources (e.g., two different social networks (102), two different search engines (104), any combination thereof, etc.); and (iii) user only wants profile records that have at least two positive actions (defined below) and no more than one negative action (defined below). In one embodiment of the invention, the general preferences for a given user may also be determined by looking at the aggregate actions of all other users in the same organization as the particular user. For example, the activities from all users of company X may be used to "learn" general preferences for the particular user.

The following is an example of a search-specific preference. Consider a scenario in which the user is looking for a "JAVA programmer" and that the user has previously performed the same search (or a similar search). In such cases, using actions (discussed below) performed by the user during the last search, the search-specific preferences may include the following preferences: (i) user prefers profile records with J2EE listed as a skill; (ii) user prefers at least 3 years of experience; and (iii) user prefers potential job candidates that went to Stanford or U.C. Berkley.

In one embodiment of the invention, user preferences (general or search specific) may be entered manually or learned over time with the user of the system. Further, the user may edit both manually entered and/or learned preferences. By making the user preferences transparent (and editable), users are able to understand the impact of the various preferences on scoring of profile records (see FIG. 4) and keyword recommendations made by the keyword intelligence engine (118).

FIG. 3A shows a profile record in accordance with one or more embodiments of the invention. The profile record (300) may include, but is not limited to: (i) a profile ID (302), which uniquely identifies the potential job candidate; (ii) profile information (304), which includes information about the potential job candidate; and (iii) one or more action records (306) (see FIG. 3B).

In one embodiment of the invention, the profile information (304) may include, but is not limited to: name; location; current and previous titles; education and degree(s); current and previous employers/companies; skills (keywords); recommendations; number of social connections; number of publications/patents/public speaking engagements; network profile URL and ids; source the data was imported from; time and date of import; current employment status; jobvites sent to potential job candidate; and jobvites viewed by potential job candidate. In one embodiment of the invention, a jobvite is an electronic message to view a job posting, where the job posting is managed by the service engine (106) or by another entity. In one embodiment of the invention, an entity may provide metrics relating to potential job candidate interaction with the job posting (e.g., view posting, submit job application via link in posting, etc.).

In one embodiment of the invention, the service engine (106) (or another process/component) is configured to update/obtain the above information, for example, by obtaining information about the potential job candidate from different network/services. For example: (i) Twitter may provide information relating to the interests, likes, and dislikes expressed by Twitter users (e.g., via a "tweet") in relation to specific topics, products, companies, services, books, movies etc.; (ii) on LinkedIn, users express their professional interests, work experience, degrees, school, professional connections, recommendations etc.; (iii) on Facebook, users often specify their personal networks and their interests in sports, books, movies, product/companies (e.g., via a "like" action or by "becoming a fan of"); (iv) on a Google profile, users provide blog URLs, locations, pictures and interests; and (v) on personal blog sites, a blogger may provide their resume and/or work history. Using information obtained from (i)-(v), the service engine (106), (or another process) may populate and/or update the profile information for the potential job candidate. Further, the service engine (106) (or another process) may continuously and/or periodically monitor the above sources to determine if there have been changes which need to be reflected in the profile record. If such changes are detected, the corresponding profiles are updated accordingly.

FIG. 3B shows an action record in accordance with one or more embodiments of the invention. In one embodiment of the invention, the action record (306) includes an action (308) (which may be positive or negative), optionally a user ID (202) (corresponding to the user that performed the action, if appropriate), and optionally a profile ID (302) corresponding to the job candidate that performed the action (if appropriate) or corresponding to the job candidate for which the action was performed.

Examples of actions include, but are not limited to, (i) positive actions and (ii) negative actions.

Positive actions include, but are not limited to: Import Actions: Users may import job candidates returned in search results into their own CRM database (not shown) or the profile database (108). The search engine interprets this action as the user "likes" (i.e., prefers) these kinds of candidates with respect to a particular search query. For example, if person B is imported into a CRM database in response to a query "Java Engineer," the service engine (106) logs it and interprets it as a positive action for B with respect to "Java Engineer." Further, the service engine (106) may "learn" this information and use it in future searches. For example, in a future search, if the same user inputs similar queries, similar candidates will be returned and scored (discussed below) higher. Send Jobvites: If person A sends a Jobvite of "Java Engineer" to person B, the service engine (106) interprets it as a positive action for B with respect to "Java Engineer." Schedule Interviews: Person B is scheduled an interview with respect to "Java Engineer." Positive Interview Evaluation Person B is given a good comment in interviews. Job Offer: Person B is offered a job of "Java Engineer." Applied a Job: Person B applies for a job of "Java Engineer."

Negative actions include, but are not limited to: Delete Action: Users can delete potential job candidates in search results. The service engine (106) interprets this action as the user "doesn't like" these kinds of candidates with respect to the search query. For example, it may be that the user thinks that the potential job candidate's background and qualification are irrelevant to the search queries. Alternatively, it may be that the user thinks the results are spam. Further, the service engine (106) may "learn" this information and use it in future searches. For example, in a future search, if the same user inputs similar queries, similar candidates will not be returned or may be returned with a lower score. For example, if Person B is deleted from search results with the query "Java Engineer," the service engine (106) logs it and interprets it as a negative action for B with respect to "Java Engineer." Negative Interview Evaluation: Person B is given a poor comment in interviews. Reject Action: Person B's application of "Java Engineer" is rejected.

Those skilled in the art will appreciate that while the above actions may be used to score (see below) the profile record for the job candidate, the actions may also be used to verify the information in the profile record or the populate the profile record. For example, if person B applies for "JAVA engineer" positions and is offered a job as a "JAVA engineer" (but declines the job offer), the profile record may be updated to reflect that person B is a JAVA engineer or indicate that person B's job title has been verified as "JAVA engineer."

In one embodiment of the invention, each action may be associated with attributes that define specific information about the action, such as what was imported, who imported the profile record, when was the jobsite sent, etc. The attribute provides additional information that may be used to generate user preferences and/or score profile records.

Figure 4:
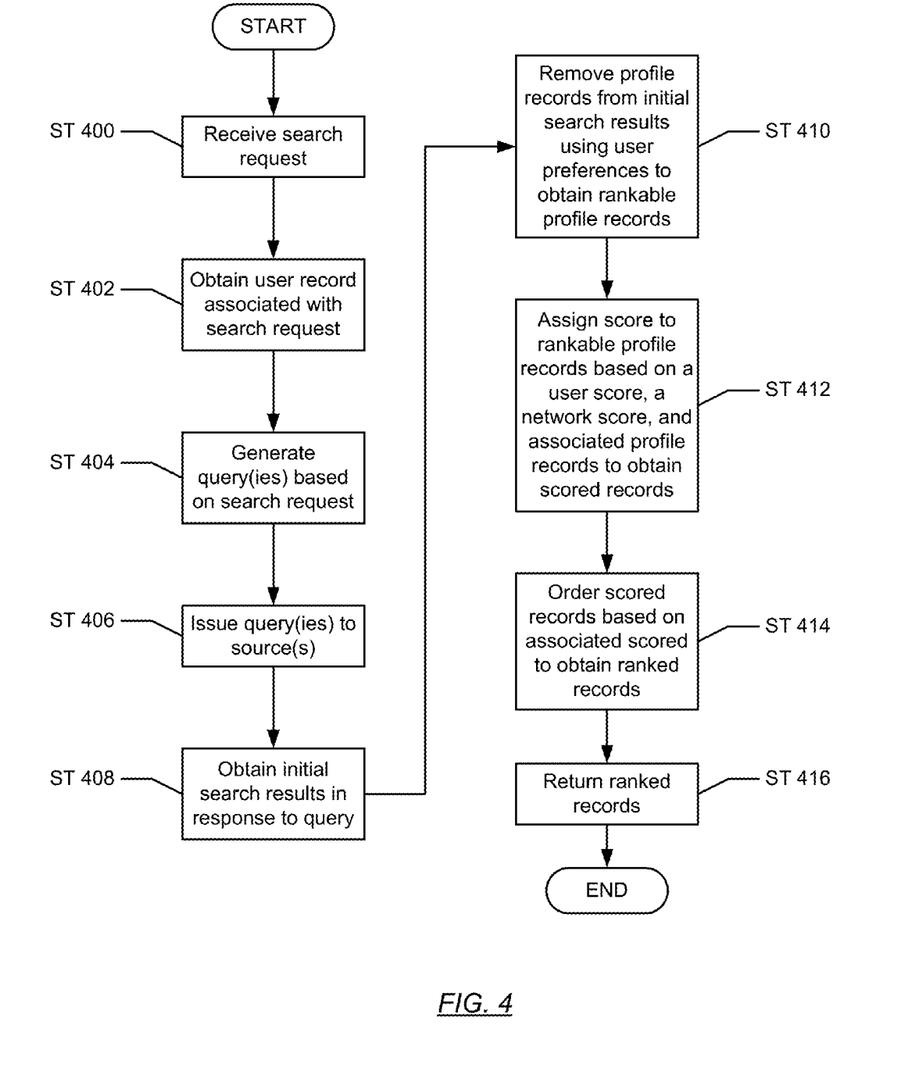
FIG. 4 shows a flow chart in accordance with one or more embodiments of the invention.

FIG. 4 shows a flow chart in accordance with one or more embodiments of the invention. While the various steps in this flowchart are presented and described sequentially, one of ordinary skill will appreciate that some or all of the steps may be executed in different orders, may be combined, or omitted, and some or all of the steps may be executed in parallel.

In Step 400, a search request is received by the service engine. In one embodiment of the invention, the search request is issued from the client to the service front-end (112). Upon receipt, the service front-end (112) performs the necessary formatting and then sends the search request (in the appropriate form) to the service engine. In one embodiment of the invention, the search request may include key words relating to a particular job. For example, such key words may include, but are not limited to, job qualifications, location of job, location of candidate, etc. Further, the search request may specify particular locations in which to look for potential job candidates (e.g., particular social networks (102), the profile database (108), a database of the user located on the client, a particular network, any other source, or any other combination thereof).

In one embodiment of the invention, instead of receiving a search request, an automatic search request may be generated based on the system identifying an open job.

In Step 402, the service engine obtains the user record (200) associated with the search request. Said another way, the service engine obtains the user record (200) for the user that issued the search request.

In Step 404, the service engine generates the query using the user record (200) and the keyword intelligence engine (118). The service engine may use the user record (200) to determine user preferences relevant to the particular search request. Further, the service engine may use the keyword intelligence engine (118) to obtain additional keywords related to the keywords present in the search request. As discussed above, the keywords may be presented to the user for acceptance, modification, and/or removal prior to proceeding with the generation of the queries. The service engine (100), upon obtaining the information from the user record (200) and the keyword intelligence engine (118) may generate one or more queries. In particular, based on which sources will be queried (e.g., social network (102), search engine (104), profile database (108), etc.), the service engine may generate one or more queries for each source. In Step 406, the queries are issued to the sources. In Step 408, the initial results from the queries are obtained. In one embodiment of the invention, the initial results may include profile records from the profile database (108), records from a database of the user located on the client, as well as files obtained via social networks (102) and/or search engines (104).

In Step 410, the initial results are culled to remove: (i) profile records that the user has previously performed a "delete" action on; (ii) files that are not resumes as determined by: (a) the service engine determining that the file is not a resume (or equivalent document) or (b) other users have previously determined that the file is not a resume (or equivalent document); (iii) profile records, resumes or equivalent documents based on a user preference (e.g., obtained from the user record (200)). The result of performing Step 410 is the obtaining of rankable profile records. Those skilled in the art will appreciate that, prior to Step 412, the resumes that were obtained from the search that were not culled in Step 410 may be imported into the profile database (108) as profile records. Further, the service engine (as described above) may perform various actions to populate such profile records prior to Step 412.

In Step 412, a score is assigned to each of the rankable profile records. In one embodiment of the invention, the score assigned to each of the rankable profile records is based on a user score and a network score. In one embodiment of the invention, the user score is determined using the user profile and the corresponding profile record. More specifically, in one embodiment of the invention, a weight (based on relative importance to the user as determined by the user preferences) is applied to each action (positive or negative) that the user has performed on the particular profile record. In one embodiment of the invention, the network score is an aggregate score of all other users that have performed actions on the particular profile record. The user score and the network score are subsequently combined (potentially with the user score or the network score having more weighting relative to the other score) to generate a score. The above process is repeated for each rankable profile record. The result of performing Step 412 is obtaining scored records.

Figure 6A:
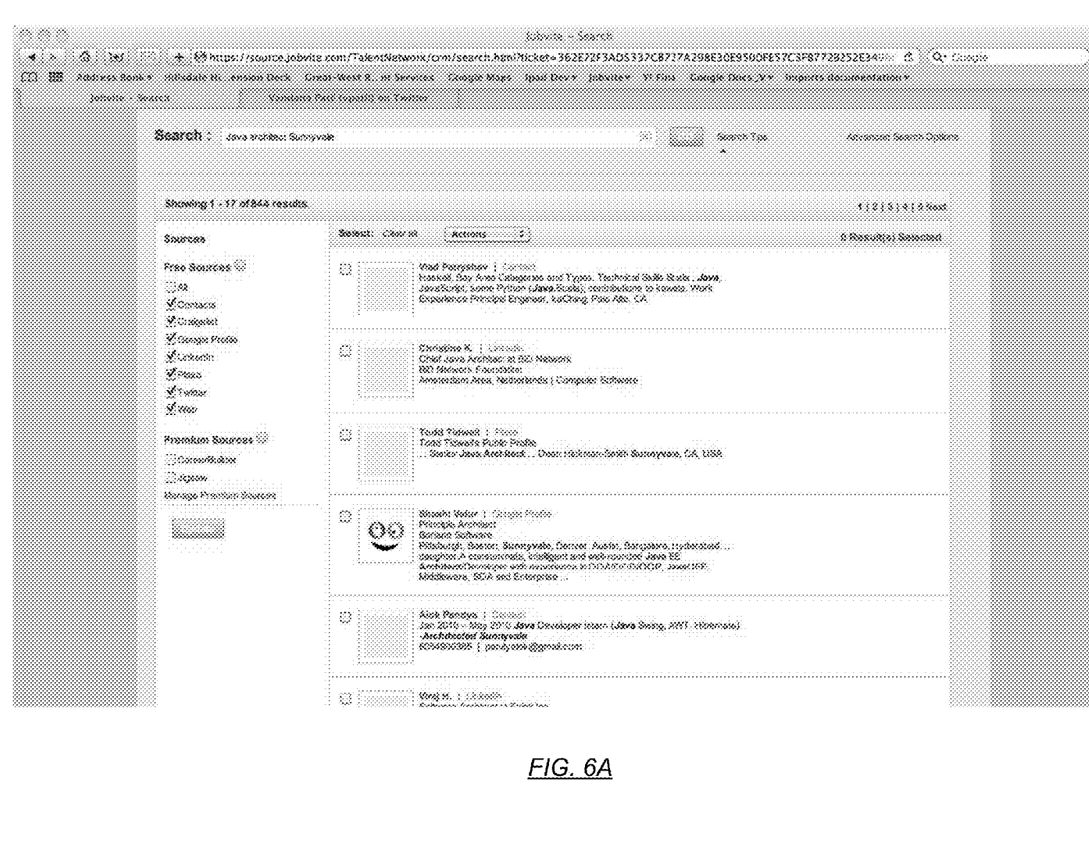
FIGS. 6A-6C shows screenshots in accordance with one or more embodiments of the invention.
Figure 6B:
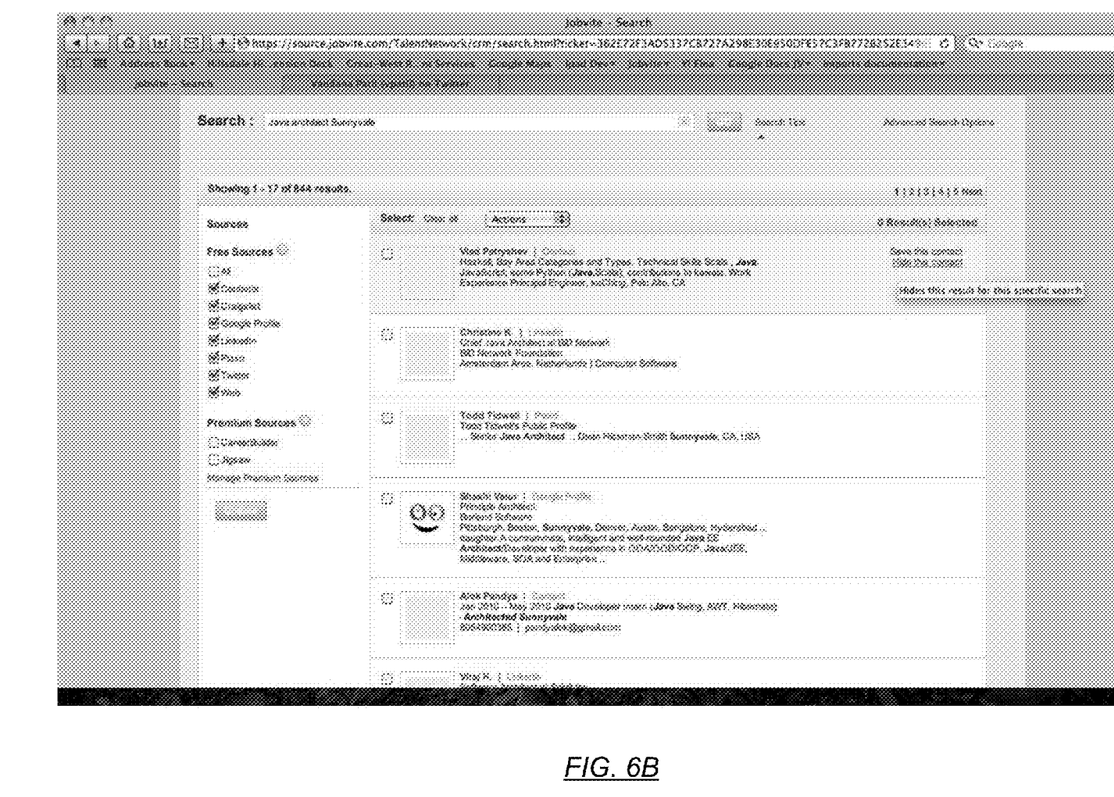
Figure 6C:
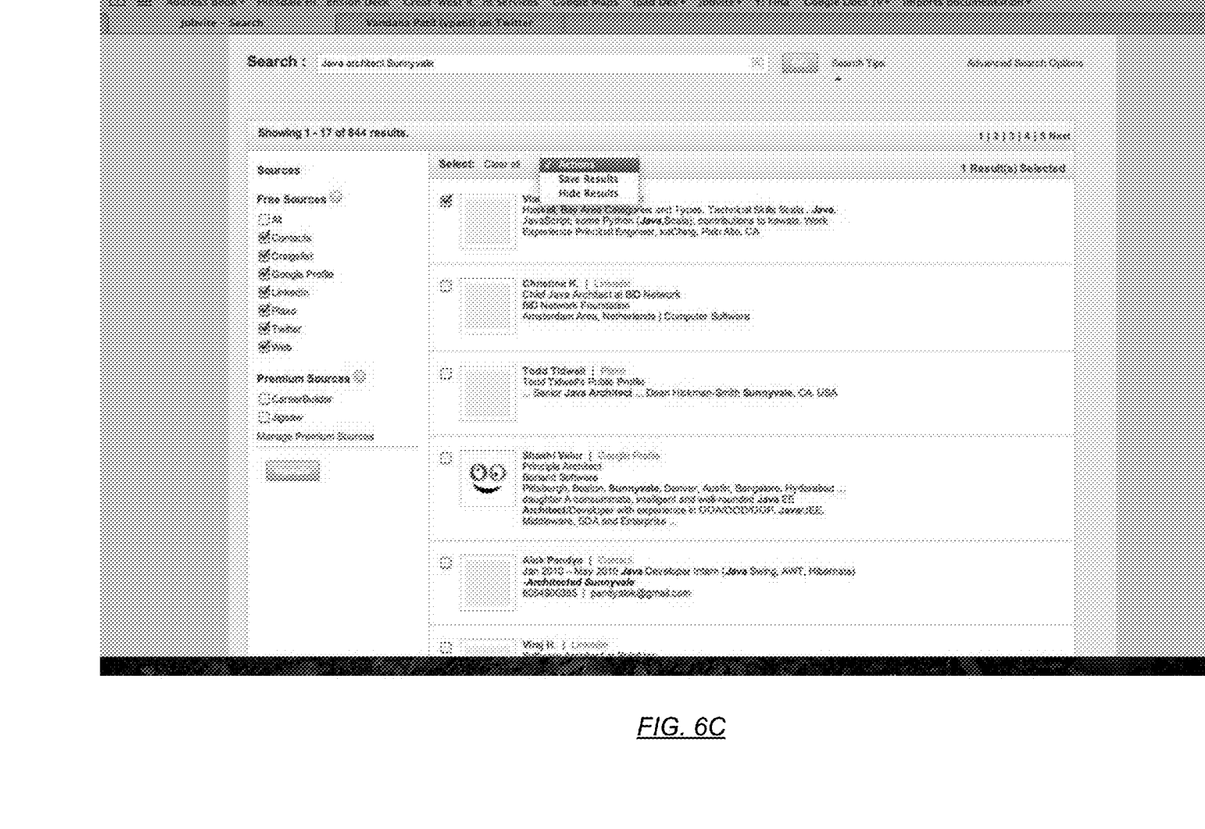

In Step 414, the scored records are subsequently ranked based on the scores determined in Step 412 to obtain ranked records. In Step 416, the ranked records are returned to the service front-end, which then sends them to the client. Examples of ranked records are shown in FIGS. 6A-6C.

At this stage, the user (via the client) may perform various actions on the records. The actions performed by the user may be used to update the user preferences and may also impact the score associated with a given profile record (depending on what actions the user performs on the record). In one embodiment of the invention the actions performed by a given user may be stored in the user profile. Further, two users with the same search request may receive different ranked records based on one or more of the following: (i) their user profiles; (ii) actions that have been performed by the job candidate; and (iii) the profile record of the job candidate.

Figure 5:
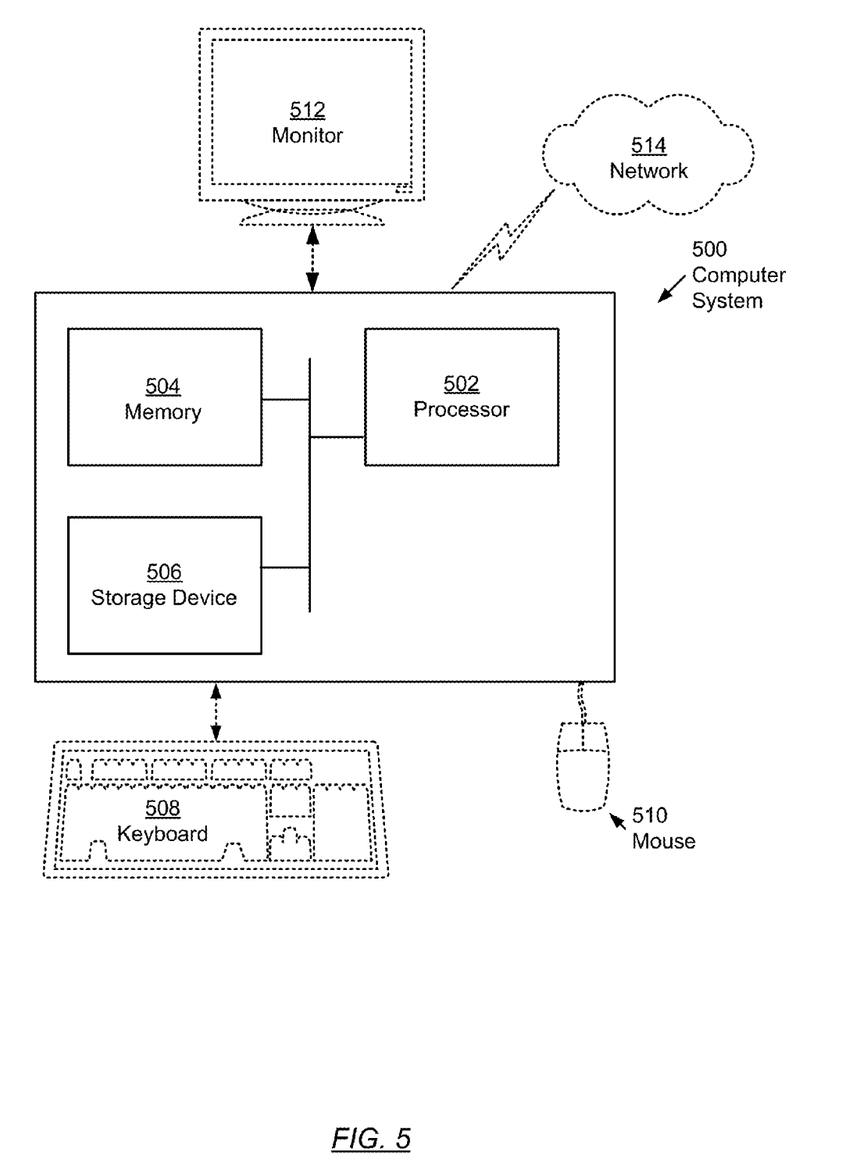
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., service front-end, service engine, profile database, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for ranking profile records comprising:
receiving a search request from a user, wherein the search request includes a job title;
obtaining a user profile associated with the user;
generating a query based on the search request;
issuing the query to a profile database;
receiving search results in response to the query, wherein the search results comprise a plurality of profile records, and wherein each of the plurality of profile records comprises a plurality of action records and is associated with a potential job candidate;
obtaining a network score for each of the plurality of profile records to obtain a plurality of network scores using the plurality of action records,
wherein the network score for each of the plurality of profile records is generated based on at least one selected from a group consisting of a positive action and a negative action performed by other users on each of the plurality of profile records,
wherein the positive action performed by the other users is one selected from a group consisting of scheduling a job interview and a positive interview evaluation,
wherein the negative action performed by the other users is one selected from a group consisting of a negative interview evaluation and rejection of the potential job candidate associated with one of the plurality of profile records for the job;
obtaining a user score for each of the plurality of profile records to obtain a plurality of user scores, wherein the user score for each of the plurality of profile records is generated based on at least one selected from a group consisting of a positive action and a negative action performed by the potential job candidate associated with each of the plurality of profile records,
ranking the plurality of profile records using the plurality of user scores and the plurality of network scores to obtain ranked profile records; and
transmitting the ranked profile records to the user.

2. The method of claim 1, wherein the user profile comprises user preferences associated with the user.

3. The method of claim 2, wherein the user preferences comprise general preferences and search-specific preferences.

4. The method of claim 3, wherein the general preferences comprise user-specified preferences and learned preferences.

5. The method of claim 3, wherein the search-specific preferences comprise user-specified preferences and learned preferences.

6. The method of claim 1, wherein each of the action records associated with one of the plurality of profile records comprises an action and a user ID associated with a user that performed the action on the profile record.

7. The method of claim 1, wherein generating the query based on the search request comprises obtaining additional keywords for the query from a keyword intelligence engine.

8. The method of claim 1, wherein generating the query based on the search request comprises obtaining additional keywords for the query based on the user record.

9. The method of claim 1, wherein the query is further issued to a network wherein the search results further comprise results from issuing the query to the network.

10. The method of claim 9, wherein the network is the Internet.

11. The method of claim 9, wherein the query is further issued to a service wherein the search results further comprises result from issuing the query to the service.

12. The method of claim 11, wherein the service is a social network service.

13. The method of claim 1, wherein determining a network score of the plurality of network scores comprises:
determining a weighting factor for each action performed by the other users on one of the plurality of profile records, wherein each action is one selected from a group consisting of the positive action and the negative action performed by other users on one of the plurality of profile records;
generating a positive score using the positive actions and the weighting factors for each of the positive actions;
generating a negative score using the negative actions and the weighting factors for each of the positive actions; and
generating a network score using the positive score and the negative score.

14. A computer readable storage medium comprising instructions for ranking profile records, the instructions comprising functionality to:
receive a search request from a user;
obtain a user profile associated with the user;
generate a query based on the search request;
issue the query to a profile database;
receive search results in response to the query, wherein the search results comprise a plurality of profile records, and wherein each of the plurality of profile records comprises a plurality of action records;
obtain a network score for each of the plurality of profile records to obtain a plurality of network scores using the plurality of action records,
wherein the network score for each of the plurality of profile records is generated based on at least one selected from a group consisting of a positive action and a negative action performed by other users on each of the plurality of profile records,
wherein the positive action performed by the other users is one selected from a group consisting of scheduling a job interview and a positive interview evaluation,
wherein the negative action performed by the other users is one selected from a group consisting of a negative interview evaluation and rejection of the potential job candidate associated with one of the plurality of profile records for the job;
obtain a user score for each of the plurality of profile records to obtain a plurality of user scores, wherein the user score for each of the plurality of profile records is generated based on at least one selected from a group consisting of a positive action and a negative action performed by the potential job candidate associated with each of the plurality of profile records,
rank the plurality of profile records using the plurality of user scores and the plurality of network scores to obtain ranked profile records; and
transmit the ranked profile records to the user.

15. The computer readable storage medium of claim 14, wherein the user profile comprises user preferences associated with the user.

16. The computer readable storage medium of claim 15, wherein the user preferences comprise general preferences and search-specific preferences.

17. The computer readable storage medium of claim 16, wherein the general preferences comprise user-specified preferences and learned preferences.

18. The computer readable storage medium of claim 16, wherein the search-specific preferences comprise user-specified preferences and learned preferences.

* * * * *